United States Patent
Lee et al.

(10) Patent No.: US 8,306,559 B2
(45) Date of Patent: Nov. 6, 2012

(54) METHOD AND APPARATUS FOR PAGING OPTIMIZATION OF BASE STATION SUPPORTING HYBRID CELL

(75) Inventors: Seung-Que Lee, Daejeon (KR); Hyung Deung Bae, Daejeon (KR); Jun Sik Kim, Daejeon (KR); Sang Chul Oh, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 204 days.

(21) Appl. No.: 12/819,687

(22) Filed: Jun. 21, 2010

(65) Prior Publication Data

US 2011/0143783 A1 Jun. 16, 2011

(30) Foreign Application Priority Data

Dec. 15, 2009 (KR) ........................ 10-2009-0124834

(51) Int. Cl.
*H04W 68/00* (2009.01)
(52) U.S. Cl. ...... 455/458; 455/411; 455/434; 455/435.1
(58) Field of Classification Search .................. 455/411, 455/422.1, 426.1, 444–446, 434–436, 438, 455/450, 458, 509, 560, 561; 370/252, 254, 370/310, 312, 328–333, 335–338
See application file for complete search history.

(56) References Cited

U.S. PATENT DOCUMENTS

| | | | |
|---|---|---|---|
| 2007/0105568 A1* | 5/2007 | Nylander et al. | 455/458 |
| 2009/0098890 A1 | 4/2009 | Vasudevan et al. | |
| 2010/0112980 A1* | 5/2010 | Horn et al. | 455/411 |
| 2010/0190533 A1* | 7/2010 | Black et al. | 455/571 |
| 2011/0105132 A1* | 5/2011 | Vasudevan et al. | 455/448 |

FOREIGN PATENT DOCUMENTS

| | | |
|---|---|---|
| JP | 2009-232277 | 10/2009 |
| KR | 1020080045096 | 5/2008 |
| KR | 1020090045183 | 5/2009 |

* cited by examiner

*Primary Examiner* — Ajit Patel
*Assistant Examiner* — Erica Navar
(74) *Attorney, Agent, or Firm* — Nelson Mullins Riley & Scarborough LLP; EuiHoon Lee, Esq.

(57) ABSTRACT

A method for paging optimization in a communication system having one or more base stations and one or more mobile stations within a paging target cell, includes detecting a hybrid base station supporting a hybrid cell from the one or more base stations; and determining whether or not one or more mobile stations registered in the hybrid cell include only closed subscriber group (CSG) members, and defining an operating state of the hybrid base station based on the determination result. The method further includes determining whether or not each of the one or more base stations is included in paging targets based on the operating state of the hybrid base station.

18 Claims, 4 Drawing Sheets

METHOD AND APPARATUS FOR PAGING OPTIMIZATION OF BASE STATION SUPPORTING HYBRID CELL

CROSS-REFERENCE(S) TO RELATED APPLICATION

The present invention claims priority of Korean Patent Application No. 10-2009-0124834, filed on Dec. 15, 2009, which is incorporated herein by reference.

FIELD OF THE INVENTION

The present invention relates to a method and apparatus for paging optimization of a base station supporting a hybrid cell. More particularly, the present invention relates to a method which defines an operating state of a hybrid base station as a hybrid-closed type when one or more mobile stations registered in a hybrid cell include only closed subscriber group members, and defines an operating state of a hybrid base station as a hybrid-opened type when one or more mobile stations registered in the hybrid cell do not include closed subscriber group members, and excludes hybrid base stations to which mobile stations are not subscribed from paging targets among hybrid base stations having an operating state defined as the hybrid-closed type.

BACKGROUND OF THE INVENTION

Mobile communication base stations can be largely classified into an opened base station, a closed base station and a hybrid base station in a method for controlling an access to a mobile station. The opened type base station is a base station which provides all mobile stations with services regardless of the qualification of a mobile station. The closed type base station is a base station which organizes a closed subscriber group (CSG) consisting of specific mobile stations and offers services only to the mobile stations corresponding to CSG members.

Meanwhile, the hybrid base station is a base station which supports all of the opened and closed base stations. The hybrid base station operates in a closed type for the CSG members, and operates in an open type for general mobile stations which are not the CSG members.

Such user access control method has been introduced as the use of base stations for personal possession or private use increases in addition to the use of base stations for the existing enterpriser's possession or common use. In particular, as femtocell base stations that provide a mobile communication service in areas of approximately 100 m radius inside homes or buildings start to be installed, the user access control method became an essential element. On the other hand, hybrid cells stand for cells that are controlled by hybrid base stations, and serve as an important factor of supporting the enlargement of cell coverage and avoiding interferences between macro cells and femto cells. Meanwhile, a paging is to call and find a mobile station within a specific paging area in a mobile communication system. The paging area indicates an area that is discriminated by a unit of tracking of mobile station, and is defined as a location area (LA) or tracking area (TA) in 3rd generation partnership project (3GPP). A paging optimization is a method which minimizes unnecessary calls of the mobile station through a paging. Since the paging requires using radio resources such as a paging channel, the paging optimization provides an effect of enhancing the performance of system by reducing the use of unnecessary radio resources. Particularly, when a number of femtocell base stations are designated as one paging area, the reduction of unnecessary paging is effective in the reduction of signaling between a core network and the base stations.

A conventional method for paging optimization involves removing unnecessary paging in a closed cell environment. For instance, when a mobile station as a paging target is subscribed to a CSG, a core network obtains an allowed CSG list of the mobile station as the paging target before performing a paging to a paging area. The allowed CSG list of the mobile station is a set of CSG identifiers (IDs) of base stations that mobile stations as CSG members can receive mobile communication services. Among base stations belonging to the paging area, the CSG IDs of base stations operating in a closed type are checked to exclude base stations that do not exist in the allowed CSG list of the mobile station from paging targets. That is, for closed base stations to which a mobile station cannot access among base stations as the paging targets, no paging is attempted.

Meanwhile, in the conventional method described above, base stations operating in an open or hybrid type have been excluded from paging optimization targets. This is because the opened or hybrid base stations can provide services for general users or non-allowed CSG members due to its nature. Thus, in the conventional paging optimization method, all of base stations operating in an open or hybrid type are included in the paging targets.

FIG. 1 shows a conventional radio communication system. Mobile communication base stations can be classified into an opened base station, a closed base station, and a hybrid base station in a method for controlling an access to a mobile station. In FIG. 1, a first base station 130 operates as an opened base station, and second and third base stations 140 and 150 operate as closed base stations. And, fourth and fifth base stations 160 and 170 operate as hybrid base stations. The first to fifth base stations are connected to a core network device 100 via an IP network 120.

The conventional paging optimization method excluded only closed base stations to which a mobile station cannot access from the paging targets. In the conventional method, since the base stations that operate in the open or hybrid type can be used by general users or mobile stations that are not the CSG members, all of these base stations are included in the paging targets without checking the optimization conditions upon paging.

Referring to FIG. 1, the second and third base stations 140 and 150 which are the closed base stations may be included in the paging optimization targets and thus may not be the paging targets, but the first base station 130 which is the opened base station and the fourth and fifth base stations 160 and 170 which are the hybrid base stations are necessarily included in the paging targets. However, the present invention allows the hybrid base stations not to belong to the paging targets by also including them in the paging optimization targets.

In other words, the conventional method has a limit in the efficiency because the base stations that are the paging optimization targets are limited to closed base stations only.

Consequently, there is an increasing need for a hybrid base station because of the enlargement of coverage area, interference avoidance and the like. However, the present invention allows the hybrid base stations not to belong to the paging targets by also including them in the paging optimization targets.

SUMMARY OF THE INVENTION

The present invention provides a method and apparatus for paging optimization, which allow hybrid base stations to belong to paging optimization targets by applying the paging optimization method to a hybrid cell.

In accordance with an aspect of the present invention, there is provided a method for paging optimization in a communication system having one or more base stations and one or more mobile stations within a paging target cell. The method includes: detecting a hybrid base station supporting a hybrid cell from the one or more base stations; determining whether or not one or more mobile stations registered in the hybrid cell include only closed subscriber group (CSG) members, and defining an operating state of the hybrid base station based on the determination result; and determining whether or not each of the one or more base stations is included in paging targets based on the operating state of the hybrid base station.

In accordance with another aspect of the present invention, there is provided with an apparatus for paging optimization in a communication system having one or more base stations and one or more mobile stations within a paging target cell. The apparatus includes: a detection unit for detecting a hybrid base station supporting a hybrid cell from the one or more base stations; a definition unit for determining whether or not one or more mobile stations registered in the hybrid cell include only closed subscriber group (CSG) members, and defining an operating state of the hybrid base station based on the determination result; and a determination unit for determining whether or not each of the one or more base stations is included in paging targets based on the operating state of the hybrid base station.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

The embodiments of the present invention will be described with reference to the accompanying drawings which form a part hereof.

Figure 1:
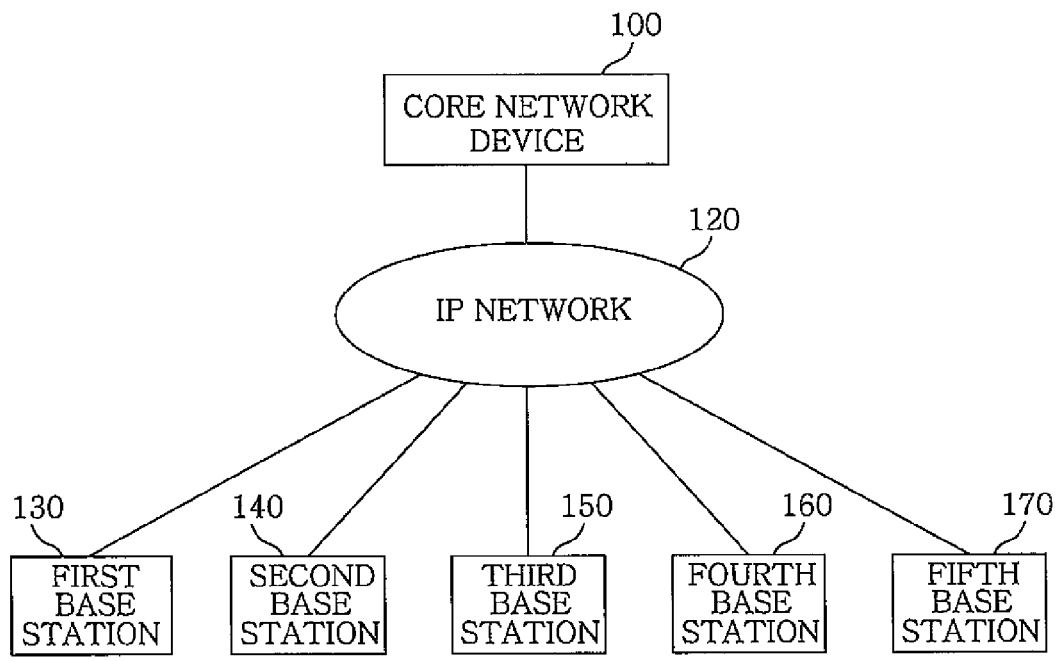
FIG. 1 shows a conventional radio communication system.
Figure 2:
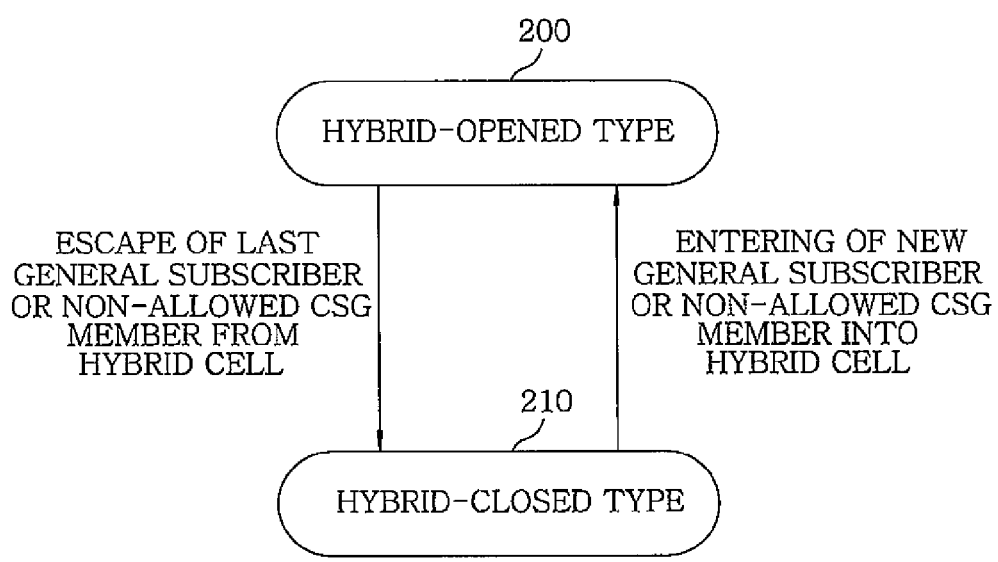
FIG. 2 illustrates an operating state of a hybrid base station supporting a hybrid cell in accordance with an embodiment of the present invention.

FIG. 2 illustrates an operating state of a hybrid base station supporting a hybrid cell in accordance with an embodiment of the invention. The operating states of hybrid base stations can be classified into two: a hybrid-opened type 200 and a hybrid-closed type 210.

The hybrid-opened type 200 indicates a case where there exists a general subscriber, which is not an allowed CSG member, or a non-allowed CSG member, among mobile stations that enter a hybrid cell supported by a hybrid base station and that are registered in the hybrid cell. Meanwhile, the hybrid-closed type 210 indicates a case where all of mobile stations registered within the hybrid cell are allowed CSG members. That is, among base stations operating in the hybrid type, hybrid base stations, which actually operate in the closed type because the mobile stations registered within the hybrid cell are all the CSG members, are defined as having the hybrid-closed type 210 as their operating states.

For example, when a general subscriber or non-allowed CSG member enters the hybrid cell in a base station having the operating state of the hybrid-closed type 210, the operating state of the base station is changed to the hybrid-opened type 200. To the contrary, when a last left general subscriber or non-allowed CSG member escapes from the hybrid cell in a base station operating in the hybrid-opened type 200, and then when the rest mobile stations are all include only the allowed CSG members, the operating state of the base station is changed to the hybrid-closed type 210.

Such operation state of the base station is dynamically defined based on a dynamic state that the allowed CSG member or general subscriber or non-allowed CSG member enters the hybrid cell or escapes therefrom.

Figure 3:
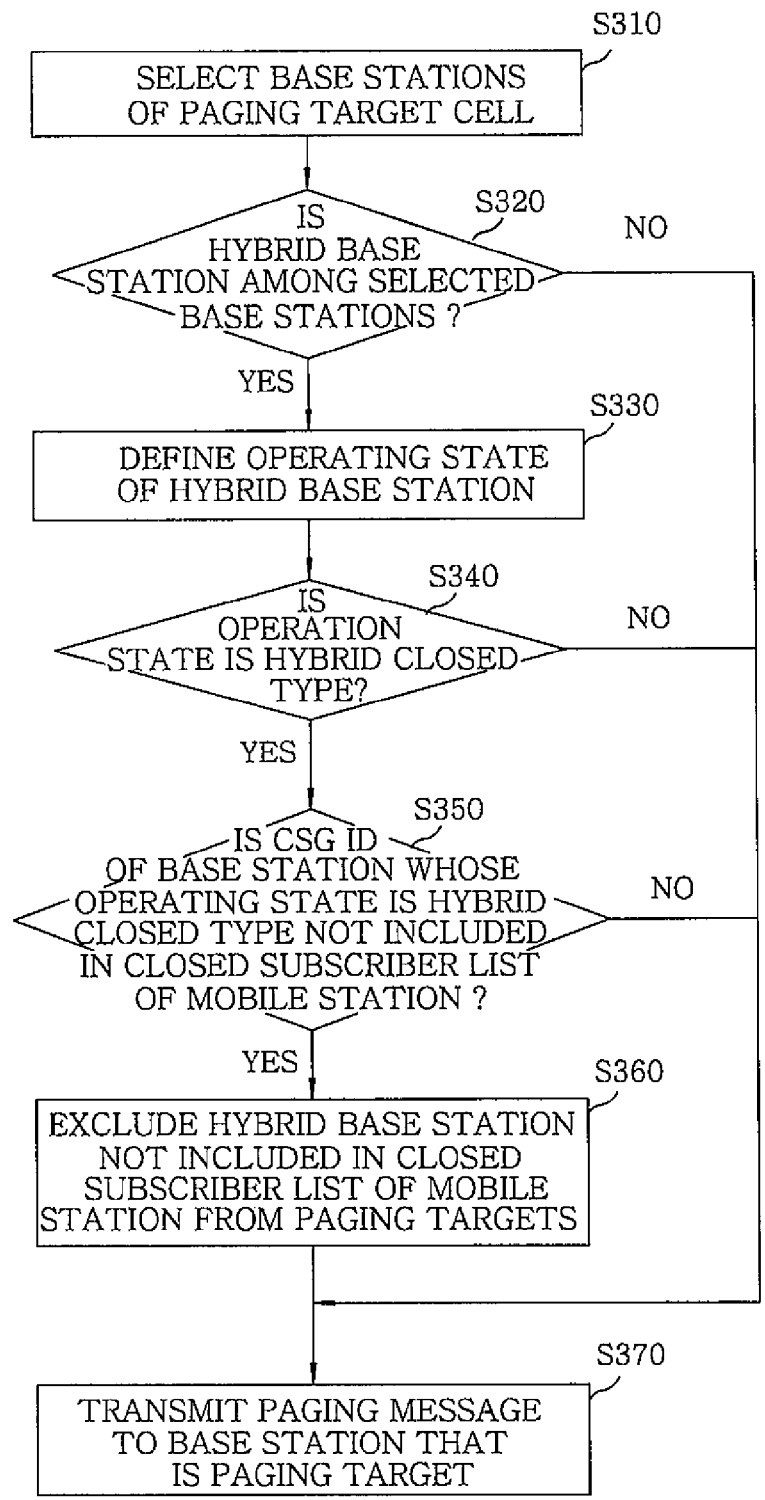
FIG. 3 is a flowchart schematically illustrating a method for paging optimization in accordance with an embodiment of the present invention.

FIG. 3 is a flowchart schematically illustrating a method for paging optimization in accordance with an embodiment of the present invention. The paging optimization method can be performed by the paging optimizing apparatus described above.

First, base stations of a cell which need to perform a paging are selected at step S310. After selecting the base stations of the cell which need to perform a paging, it is determined at step S320 to whether there are hybrid base stations in the selected base stations. If there are the hybrid base stations, operating states of the hybrid base stations are defined at step S330. The operating state of the hybrid base station may be a hybrid-closed type or a hybrid-opened type. It is determined at step S340 whether, among the hybrid base stations whose operating states are defined, there is a base station having an operating state of a hybrid-closed type. If there is a base station of the hybrid-closed type, it is checked whether or not a mobile station that is a CSG member has been subscribed to the corresponding base station. The subscription or non-subscription of the mobile station may be determined depending on whether a CSG ID of a hybrid-closed base station is included in a CSG list of the mobile station at step S350. The CSG list of the mobile station is a list that indicates CSG IDs of base stations from which the mobile station can get services. If there is a base station having a CSG ID that is not included in the CSG list of the mobile station, the corresponding base station is excluded from the paging targets at step S360.

Meanwhile, if there is no base station operating in the hybrid type, or although there is a hybrid base station, if it is operating in the hybrid-opened type, or although the hybrid base station is operating in the hybrid-closed type, if a CSG ID of the base station is within a CSG list of a mobile station, the corresponding base station is not excluded from the paging targets but performs a paging procedure.

Figure 4:
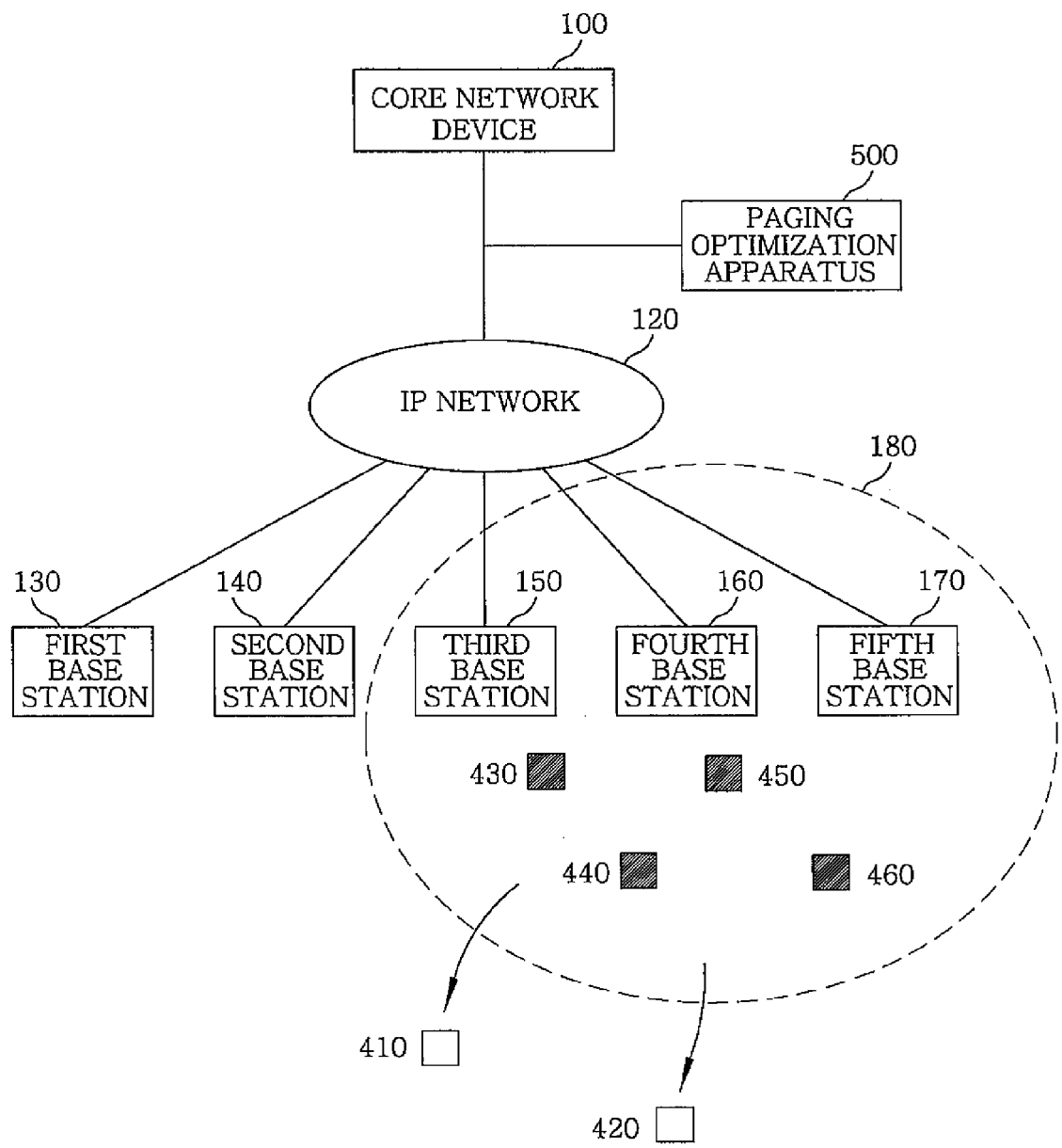
FIG. 4 illustrates a radio communication system in which the paging optimization method in accordance with the embodiment of the present invention is executed.

FIG. 4 illustrates a radio communication system in which the paging optimization method in accordance with the embodiment of the present invention is executed. First to fifth base stations 130 to 170 shown in FIG. 4 are connected to a core network device 100 via an IP network 120. A paging optimization apparatus 500 is located between the core network device 100 and the IP network 120, wherein the paging optimization apparatus is adapted to perform the paging optimization method described above.

For example, the first base station 130 may be an opened base station, and the second station may be a closed base station, and the third to fifth base stations 150 to 170 may be hybrid base stations. Within a hybrid cell 180 supported by the third to fifth base stations 150 to 170, there may exist a number of mobile stations. In FIG. 4, mobile stations 410 and 420 are not for the CSG members, and mobile stations 430 to 460 are for the CSG members. For example, when the mobile stations 410 and 420 which are not the CSG members exist in the hybrid cell 180 supported by the third to fifth base stations 150 to 170, the third to fifth base stations 150 to 170 may be enters a hybrid-opened operating state. On the other hand, when the mobile stations 410 and 420 which are not the CSG members are deviated from the hybrid cell 180 and thus only the mobile stations 430 to 460 which are the CSG members exist in the hybrid cell 180, the third to fifth base stations 150 to 170 enters a hybrid-closed operating state.

In case the third to fifth base stations 150 to 170 have the hybrid-closed operating state, the paging optimization apparatus 500 determines whether or not CSG IDs of the hybrid base stations are included in a closed subscriber list of each of the mobile stations and then whether or not each base station is included in the paging targets. For example, when only a CSG ID of the third base station 150 is included in the closed subscriber list of the mobile station 430, the mobile station 430 cannot receive services from the fourth and fifth base stations 160 and 170 and the paging optimization apparatus 500 transmits a paging message by including only the third base station among the hybrid base stations in the paging targets.

In this manner, the paging optimization apparatus 500 defines the operating states of the hybrid base stations existing in the paging target cell and excludes base stations to which the mobile stations are not subscribed among the base stations having the hybrid-closed operating state, from the paging targets, thereby reducing the number of base stations that are the paging targets and lessening unnecessary use of radio resources such as paging channel, and removing necessary signaling between the core network and the base stations. Accordingly, the efficiency of the system can be enhanced.

Figure 5:
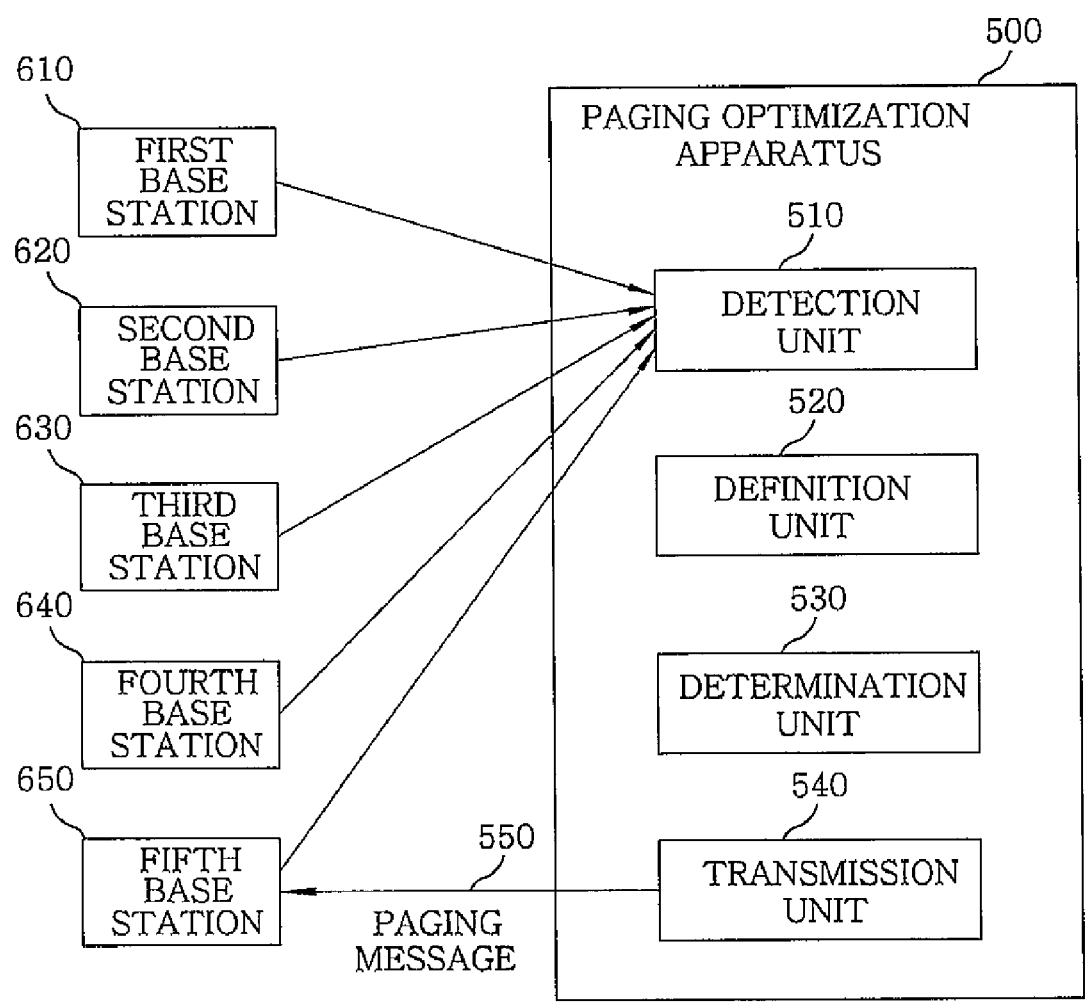
FIG. 5 provides details of the paging optimization apparatus in accordance with the embodiment of the present invention.

FIG. 5 illustrates details of the paging optimization apparatus 500 in accordance with the embodiment of the invention. For example, the paging optimization apparatus 500 includes a detection unit 510, a definition unit 520, a determination unit 530 and a transmission unit 540.

The detection unit 510 detects a hybrid base station supporting a hybrid cell among one or more base stations (e.g., first to fifth base stations 610 to 650) existing in the paging target cell.

The definition unit 520 determines whether or not one or more mobile stations registered in the hybrid cell includes only CSG members, and then defines an operating state of a hybrid base station based on the determination result. For example, when one or more mobile stations registered in the hybrid cell includes only CSG members, the definition unit 520 may define an operating state of a hybrid base station as a hybrid-closed type. When one or more mobile stations registered in the hybrid cell include non-CSG members, the definition unit 520 may define an operating state of a hybrid base station as a hybrid-opened type. In addition, the definition unit 520 may define an operating state of a hybrid base station depending on the movement of mobile stations that include CSG members or non-CSG members.

The determination unit 530 determines whether or not one or more base stations is included in the paging targets based on the operating state of the hybrid base station defined by the definition unit. For example, when one or more mobile stations registered in the hybrid cell include only CSG members, the determination unit 530 can exclude hybrid base stations to which the mobile stations are not subscribed among the hybrid base stations, from the paging targets. That is, among the hybrid base stations having the operating state defined as the hybrid-closed type, hybrid base stations to which the mobile stations are not subscribed can be excluded from the paging targets. Further, in order to determine whether or not the mobile stations have been subscribed to the hybrid base stations, it can be checked whether the CSG IDs of the hybrid base stations are included in the CSG lists of the mobile stations. When the CSG IDs of the hybrid base stations are not included in the CSG lists of the mobile stations, the corresponding hybrid base stations can be excluded from the paging targets. Meanwhile, the determination unit 530 can include hybrid base stations that have the operating state defined as the hybrid-opened type among the hybrid base stations, in the paging targets.

Based on whether or not each base station determined by the determination unit 530 is included in the paging targets, the transmission unit 540 transmits a paging message to a base station that is included in the paging targets. For example, the paging optimization apparatus 500 illustrated in FIG. 5 transmits a paging message only to the fifth base station 650, not the first to fourth base stations 610 to 640, thereby reducing the number of base stations as the paging targets and lessening unnecessary use of radio resources such as paging channel, and enhancing the efficiency of the system.

Modules, functional blocks or means in accordance with the embodiment of the present invention may be realized by various well-known devices, such as electronic circuits, integrated circuits, application specific integrated circuit (ASIC), and the like, and may be realized as separate elements or two or more thereof may be integrated into one.

As described above, the present invention can efficiently realize paging optimization based on an operating state of a hybrid base station in a hybrid cell, which was not a paging optimization target in the prior art.

In addition, the present invention has an effect that the unnecessary use of radio resources is reduced, thereby enhancing the performance of the system.

While the invention has been shown and described with respect to the particular embodiments, it will be understood by those skilled in the art that various changes and modification may be made.

What is claimed is:

1. A method for paging optimization in a communication system having one or more base stations and one or more mobile stations within a paging target cell, the method comprising:

detecting a hybrid base station supporting a hybrid cell from the one or more base stations;

determining whether or not one or more mobile stations registered in the hybrid cell include only closed subscriber group (CSG) members, and defining an operating state of the hybrid base station based on the determination result; and determining whether or not each of the one or more base stations is included in paging targets based on the operating state of the hybrid base station, wherein said defining includes:

defining the operating state of the hybrid base station as a hybrid-closed type when the one or more mobile stations registered in the hybrid cell include only the CSG members; and defining the operating state of the hybrid base station as a hybrid-opened type when the one or more mobile stations registered in the hybrid cell include non-CSG members.

2. The method of claim 1, wherein said defining includes defining the operation state of the hybrid base station depending on the movement of the one or more mobile stations that include the CSG members or non-CSG members.

3. The method of claim 1, wherein said determining includes excluding hybrid base stations to which the one or more mobile stations are not subscribed among hybrid base stations from the paging targets when the one or more mobile stations registered in the hybrid cell include only the CSG members.

4. The method of claim 3, wherein said excluding includes excluding the hybrid base stations from the paging targets when CSG identifiers (IDs) of the hybrid base stations are not included in CSG lists of the mobile stations.

5. The method of claim 4, wherein each of the CSG lists indicates CSG IDs of the base stations from which each of the mobile stations can receive services.

6. The method of claim 1, wherein said determining includes including, in the paging targets, base stations which are not hybrid base stations among the one or more base stations, and the hybrid base station when the one or more mobile stations registered in the hybrid cell include the non-CSG members.

7. The method of claim 1, wherein said determining includes excluding hybrid base stations to which the mobile stations are not subscribed among hybrid base stations having the operating state defined as the hybrid-closed type, from the paging targets.

8. The method of claim 1, wherein said determining includes including the hybrid base station having the operating state defined as the hybrid-opened type in the paging targets.

9. The method of claim 1, further comprising:
transmitting a paging message to the base station included in the paging targets.

10. An apparatus for paging optimization in a communication system having one or more base stations and one or more mobile stations within a paging target cell, the apparatus comprising:
a detection unit for detecting a hybrid base station supporting a hybrid cell from the one or more base stations;
a definition unit for determining whether or not one or more mobile stations registered in the hybrid cell include only closed subscriber group (CSG) members, and defining an operating state of the hybrid base station based on the determination result; and
a determination unit for determining whether or not each of the one or more base stations is included in paging targets based on the operating state of the hybrid base station,
wherein the definition unit defines the operating state of the hybrid base station as a hybrid-closed type when the one or more mobile stations registered in the hybrid cell include only the CSG members, and defines the operating state of the hybrid base station as a hybrid-opened type when the one or more mobile stations registered in the hybrid cell include non-CSG members.

11. The apparatus of claim 10, wherein the definition unit defines the operation state of the hybrid base station depending on the movement of the one or more mobile stations that include the CSG members or non-CSG members.

12. The apparatus of claim 10, wherein the determination unit excludes hybrid base stations to which the one or more mobile stations are not subscribed among hybrid base stations from the paging targets when the one or more mobile stations registered in the hybrid cell include only the CSG members.

13. The apparatus of claim 12, wherein the determination unit excludes the hybrid base stations from the paging targets when CSG identifiers (IDs) of the hybrid base stations are not included in CSG lists of the mobile stations.

14. The apparatus of claim 13, wherein each of the CSG lists indicate CSG IDs of the base stations from which each of the mobile stations can receive services.

15. The apparatus of claim 10, wherein the determination unit includes, in the paging targets, base stations which are not hybrid base stations among the one or more base stations, and the hybrid base station when the one or more mobile stations registered in the hybrid cell include the non-CSG members.

16. The apparatus of claim 10, wherein the determination unit excludes hybrid base stations to which the mobile stations are not subscribed among hybrid base stations having the operating state defined as the hybrid-closed type, from the paging targets.

17. The apparatus of claim 10, wherein the determination unit includes the hybrid base station having the operating state defined as the hybrid-opened type in the paging targets.

18. The apparatus of claim 10, further comprising:
a transmission unit for transmitting a paging message to the base station included in the paging targets.

* * * * *